United States Patent [19]

Davis

[11] Patent Number: 5,626,313
[45] Date of Patent: May 6, 1997

[54] ENGINE ASSEMBLY INCLUDING FUEL STORAGE BLADDER

[75] Inventor: Sanford Davis, Fair Haven, Mich.

[73] Assignee: Minowitz Manufacturing Company, Mt. Clemens, Mich.

[21] Appl. No.: 360,775

[22] Filed: Jun. 2, 1989

[51] Int. Cl.$^6$ ................................................ B64D 37/06
[52] U.S. Cl. ...................... 244/135 B; 222/96; 220/666
[58] Field of Search ........................ 244/135 B, 135 C, 244/135 R; 60/259; 220/666; 222/96, 95

[56] References Cited

U.S. PATENT DOCUMENTS

| | | | |
|---|---|---|---|
| 3,703,998 | 11/1972 | Girard | 244/135 B |
| 3,720,389 | 3/1973 | Ferris | 244/135 B |
| 4,008,831 | 2/1977 | Vidilles | 220/85 B |
| 4,723,736 | 2/1988 | Rider | 244/135 R |

Primary Examiner—Michael J. Carone
Attorney, Agent, or Firm—Reising, Ethington, Barnard & Perry

[57] ABSTRACT

An engine assembly 10 includes an inner housing 12 containing an engine in an outer housing 14 disposed about the inner housing 12 and defining a sealed chamber 16 therebetween. A fuel storage bladder 20 disposed within the chamber 16 in fluid communication with the engine through the inner housing 12. The bladder 20 includes a first wall 24 and a second wall 26 and a peripheral seam for perfecting a peripheral fuel-tight seam interconnecting the first and second walls 24, 26. The walls 24, 26 are flexible for bowing away from each other to contain fuel therebetween and lie against each other upon the application of fluid pressure from a pressure source 18. Each of the walls 24, 26 have an inner surface 28, 30 facing the inner surface of the other of the walls, the inner surfaces 28, 30 having an equal surface area whereby the inner surfaces 28, 30 completely engage each other when the bladder 20 is emptied of fuel.

11 Claims, 2 Drawing Sheets

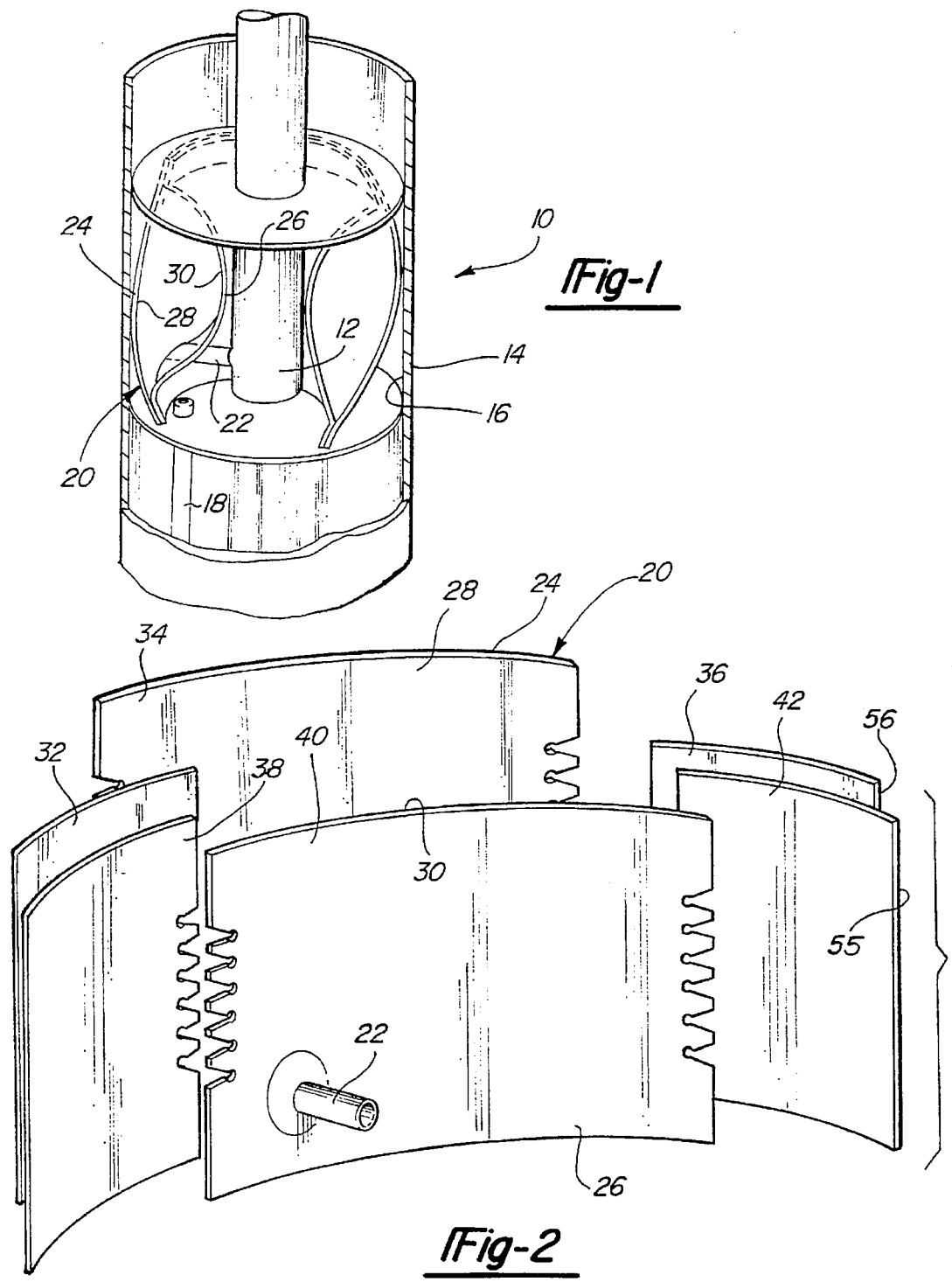

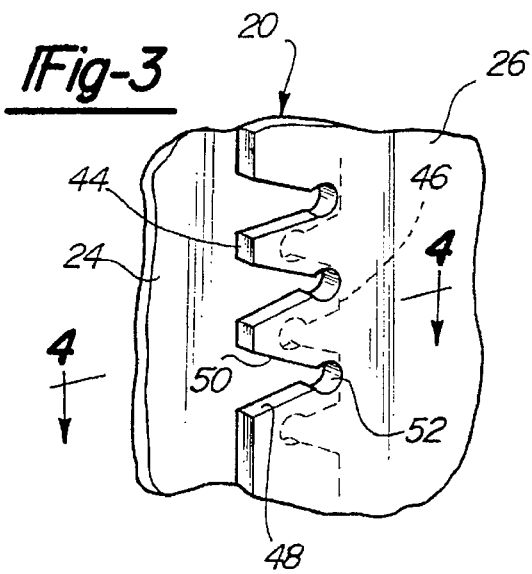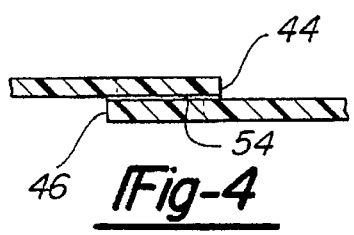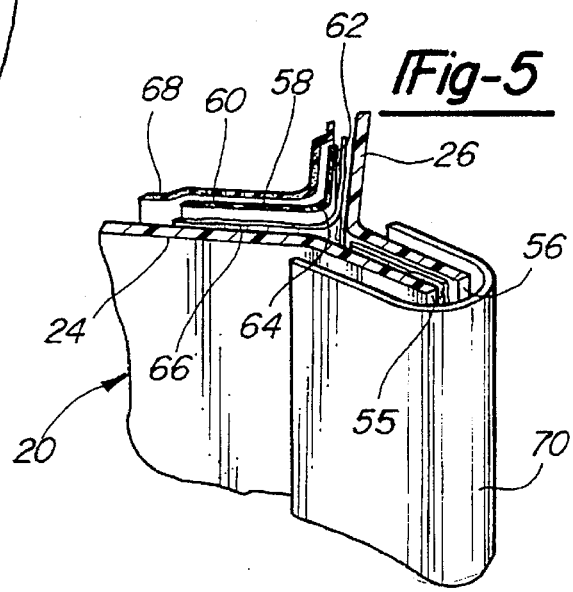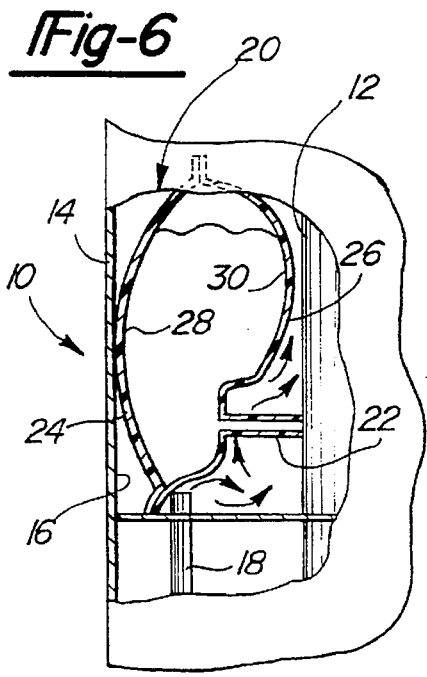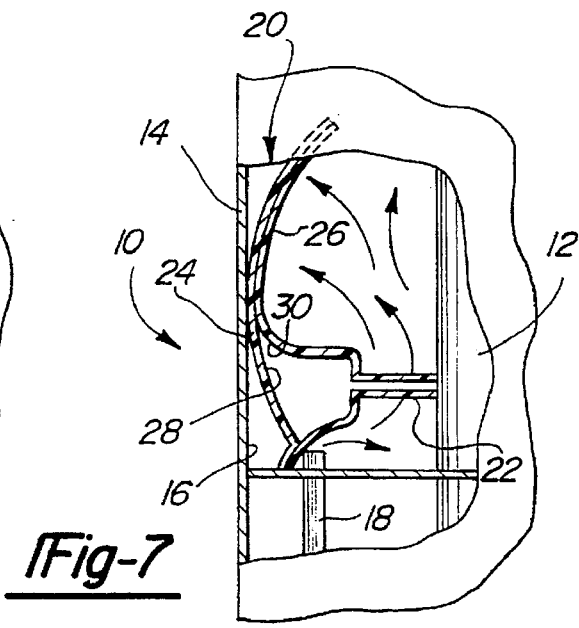

ENGINE ASSEMBLY INCLUDING FUEL STORAGE BLADDER

TECHNICAL FIELD

The present invention relates to fuel storage bladders for engine assemblies, and more particularly to flexible bladder type fuel storage assemblies.

BACKGROUND ART

Short range missiles presently utilize a fuel tank and pump for storing and pumping fuel to an engine which drives a missile to its destination. Controlling the weight of these missiles is critical. It is desirable for the missile not to carry excess fuel. Further, it is desirable for the fuel tank to be able to contain and store the fuel for extended periods of time.

Flexible fluid storage tanks have been used for storing fluids in various environments. Examples of flexible fuel storage tanks are disclosed in U.S. Pat. No. 2,724,418 to Krupp, issued Nov. 22, 1955; U.S. Pat. No. 2,736,356 to Bender et al., issued Feb. 28, 1956; U.S. Pat. No. 2,851,075 to Palfey, issued Sep. 9, 1958; U.S. Pat. No. 2,884,978 to Grimm, issued May 5, 1959; U.S. Pat. No. 2,915,097 to Lewis, issued Dec. 1, 1959; U.S. Pat. No. 3,978,901 to Jones, issued Sep. 7, 1976; U.S. Pat. No. 3,982,573 to Jones, issued Sep. 28, 1976; and U.S. Pat. No. 4,026,503 to Rhodes, issued May 31, 1977.

In particular, the U.S. Pat. No. 4,573,508 to Knaus, issued Mar. 4, 1986, discloses a collapsible storage tank for holding large volumes of material. The tank is fabricated in a rectangular shape from long lengths of rubberized square woven fabric. The lengths of fabric are oriented with overlapping adjacent edges to form inner and outer envelope structures which are integrally vulcanized to a homogeneous tank body.

The aforementioned prior art Patents provide no means for insuring that air will not be trapped within the bladder upon emptying. This is a critical concept for the use of such bladders as a fuel tank in short range missiles because it is desirable for the tank to carry only enough fuel as needed to send the missile to its desired destination. It is therefore critical that all of the fuel be exhausted from the bladder when required. Air pockets can displace the fuel thereby not allowing the bladder to carry the complete desired amount of fuel. Additionally, the bladder must be capable of emptying the entire contained quantity of fuel. Pockets of fuel as opposed to pockets of air, cannot be trapped within the bladder as it exhausts when it is critical that all the fuel contained within the bladder be used to insure the missile reaches its desired destination.

The present invention solves the aforementioned problems by providing a fuel storage bladder which obviates the need for a fuel pump by a rigid fuel tank, thereby requiring less weight, and further carrying the minimum amount of fuel necessary to reach a destination. The inventive bladder further provides means for decreasing stresses placed on the bladder per se during filling and exhaust of the fuel, thereby providing a flexible fuel container which can store fuel over an extended period of time.

SUMMARY OF THE INVENTION

In accordance with the present invention, there is provided a fuel storage bladder assembly of the type to be disposed within a sealed chamber and collapsible under the application of pressure in the chamber to force fluid out of the bladder assembly, the bladder assembly including a first wall and a second wall. Seam means perfects a fuel-tight seam interconnecting the first and second walls. The walls are flexible for bowing away from each other to contain fuel therebetween and lie against each other upon the application of fluid pressure thereagainst to empty the bladder of fuel. Each of the walls has an inner surface facing the inner surface of the other wall. The inner surfaces have an equal surface area whereby the inner surfaces completely engage each other when the bladder is emptied of fuel.

FIGURES IN THE DRAWINGS

Other advantages of the present invention will be readily appreciated as the same becomes better understood by reference to the following detailed description when considered in connection with the accompanying drawings wherein:

FIG. 1 is a perspective cross-sectional view of an engine assembly constructed in accordance with the present invention;

FIG. 2 is an exploded view of a fuel storage bladder constructed in accordance with the present invention;

FIG. 3 is an enlarged fragmentary perspective view of a seam between two sheets of the subject bladder;

FIG. 4 is a cross-sectional view taken substantially along lines 4—4 of FIG. 3;

FIG. 5 is a fragmentary perspective view in cross-section showing an edge seam of the subject bladder invention;

FIG. 6 is a fragmentary cross-sectional view of the subject bladder assembly containing fuel; and FIG. 7 is a fragmentary cross-sectional view of the subject bladder assembly being emptied of fuel.

DETAILED DESCRIPTION OF THE INVENTION

An engine assembly constructed in accordance with the present invention is generally shown at 10 in the Figures. The engine assembly 10 is schematically shown as including an inner housing 12 for containing an engine therein. An outer housing 14 is disposed about the inner housing 12 and defines a sealed chamber 16 therebetween.

The assembly 10 includes pressurizing means, such as a pressurized fluid tank in communication with the chamber 16 through conduit 18 for forcing fluid pressure into the chamber 16. Pressurized fluid could be pressurized air or an inert gas contained within a sealed container for being released into the chamber 16 and thereby increasing the internal fluid pressure thereof. A fuel storage bladder constructed in accordance with the present invention is generally shown at 20. The bladder 20 is disposed within the chamber 16 in fluid communication with the engine contained within the inner housing 12. A nozzle 22 allows the filling of fuel into the bladder 20 and the exhaust of fuel from the bladder 20. Alternatively, the bladder 20 may include a second nozzle such that one nozzle allows for the filling of fuel into the bladder and the second nozzle allows for the exhaust of fuel from the bladder to the engine. The choice of nozzles would require suitable valving of the engine and fuel inlet which are commonly known for fuel storage tanks.

The bladder 20 per se includes a first outer wall 24 and a second inner wall 26, the bladder 20 being wrapped around the inner housing 12 such that the inner wall 26 is adjacent the inner housing 12 and the outer wall 24 is adjacent the inner surface of the outer wall 14.

The bladder 20 is basically two layers 24, 26 of rubber coated nylon which are connected together by an outer seam, as discussed below. The seam perfects a peripheral fuel-tight inner connection between the first and second walls 24, 26. The walls 24, 26 are flexible for bowing away from each other, as shown in FIGS. 1 and 6 to contain fuel therebetween and lie against each other, as shown in FIG. 7 upon the application of fluid pressure from conduit 18 to empty the fuel.

Each of the walls 24, 26 has an inner surface 28, 30, respectively, facing the inner surface of the other of the walls, the inner surfaces 28, 30 having an equal surface area whereby the inner surface 28, 30 completely engage each other when the bladder 20 is emptied of fuel, as shown in FIG. 7. In other words, the inner surface area of wall 24 is equal to the inner surface area of wall 26. Thusly, as pressure is applied to the bladder 20 containing fuel, as shown in FIG. 6, the bladder 20 is emptied as it injects fuel therefrom to the engine within the inner housing 12. Since the surfaces 28, 30 of the walls 24, 26 are equal in size, the bladder 20 collapses such that the inner surfaces 28, 30 of the walls 24, 26 completely engage each other to completely empty the bladder 20 of fuel.

Thus, a known quantity of fuel can be injected into the bladder 20 for storage and that completely known quantity of fuel will be ejected therefrom. The bladder 20 does not have to carry any additional fuel which may be trapped within the bladder, thusly decreasing the necessary weight of the assembly. Additionally, the bladder does not require a fuel pump or heavy container therefor, thereby further decreasing the weight of the assembly.

As shown in FIGS. 1, 6 and 7, the first wall 24 bows outwardly and substantially engages the inner surface of the outer housing 14. The wall is flexible yet sufficiently rigid in combination with the outer seam thereabout such that the outer wall 24 maintains the bowed shape when the bladder 20 is emptied. The second inner wall 26 bows into and completely against the first wall 24, as shown in FIG. 7, when the bladder 20 is empty. The second wall 26 bows away from the first wall 24 when the bladder 20 is filled, as shown in FIGS. 1 and 6. The spacing between the inner wall 26 and inner housing 12 allows for the expansion of the inner wall 26 into the chamber 16 as the bladder 20 is filled. Since the outer wall 24 is already bowed and engages the inner surface of the outer housing 14, filling of the bladder 20 with fuel forces the second wall 26 inwardly towards the inner housing 12. The application of fluid pressure from the conduit 18 into the chamber 16 forces the second wall 26 towards the first wall 24 thereby forcing fuel from the bladder 20 into the engine within the inner housing 12. In other words, the first wall 24 bows against the outer housing 14 and the second wall 26 is spaced from inner housing 12 when the bladder 20 is emptied of fluid, the second wall 26 bowing towards and away from the inner wall 24 as the bladder 20 is filled and emptied.

As shown in FIG. 2, each of the walls 24, 26 comprises a plurality of sheets 32, 34, 36, 38, 40, 42 having edges overlapping adjacent sheets. Each of the edges which overlaps an adjacent sheet includes stress distributing means for relieving the stresses of bowing of the edges of the sheets as the walls 24, 26 bow during emptying and filling of the bladder assembly 20. This feature allows the bladder 20 to be able to contain and store fuel for extended periods of time by relieving the walls 24, 26 and seams of structural stresses. These stresses occur during the bowing and stretching of the bladder walls 24, 26 and seams during filling and exhaust of fuel. More specifically, and referring to FIGS. 3 and 4, two sheets are shown having edges 44 and 46. These edges are illustrative of the overlapping edges of the various sheets.

The stress distributing means includes a plurality of recesses along the length of the edges 44, 46 extending into each of the sheets. Each of the recesses is substantially U-shape when viewed in plan view and include two converging edge portions 48 and 50 interconnected by a substantially annular edge portion 52. The recesses along one of the edges 44 of the one of these sheets is offset from the recesses along the edge 46 of the sheet adhered thereto, as best shown in FIG. 3. As shown in FIG. 4, an adhesive sealant 54 adheres and perfects a seal between the sheets. The edge construction defined herein allows for the stresses of bowing during the filling and exhaust of fuel by the bladder 20 to be distributed away from the edges. The diverging edges 48, 50 allow for expansion and contraction during the bowing, especially of the inner wall 26. The annular or circular portion 52 distributes the stress placed on the edge in a radial fashion as opposed to the stretching being along each increment of a flat linear surface.

Each of the sheets are rubber coated nylon, such as Viton® coated nylon fabric (Viton is a registered trademark of E. I. DuPont Corporation.) Each of the walls 24, 26 includes a peripheral edge 55, 56 as best shown in FIG. 5. The bladder assembly 20 includes an inner tape 58 which is substantially U-shaped when viewed in sagital cross-section. Structurally, the tape 56 has two legs 60, 62 and an intermediate portion 64 therebetween. Each of the legs 60, 62 is adhered to the inner surface 28, 30 of one of the walls 24, 26 by an adhesive 66. The U shape of the tape 58 opens into the bladder assembly 20. An inner sealant 68 is applied to the interior of the bladder 20, thereby effecting a seal over the tape 58. The bladder assembly 20 further includes an outer sealant 70 disposed about the peripheral edges 55, 56. The sealant 70 appears as being U shaped when viewed in sagital cross-section, as shown in FIG. 5. This peripheral edge configuration provides an edge seal without requiring any folding of the sheets per se. Hence, the sheets are connected together as bowed, but not bent sheets thereby not causing stresses on the sheets due to any type of creasing or sharp pending.

In operation, upon engine ignition, pressure is applied within the chamber 16 so as to compress the inner wall 26 of the bladder 20 towards the outer wall 24. As the bladder 20 is compressed, fuel is injected from the bladder 20 into the engine within the inner housing 12. Since the inner surfaces 28, 30 of the walls 24, 26 have the same area, the bladder 20 exhausts all fuel contained therein and does not leave any air or fuel pockets. In this manner, use of the subject invention solves the critical problems of excess fuel and the necessity of a pump. The bladder assembly 20 does not require a fuel tank or pump assembly. The bladder assembly 20 insures complete use of a known quantity of fuel by having the capability of exhausting all fuel contained therein.

I claim:

1. An engine assembly (10) comprising:

an inner housing (12) containing an engine;

an outer housing (14) disposed about said inner housing (12) and defining a sealed chamber (16) therebetween;

pressurizing means (18) for forcing fluid pressure into said chamber (16); and a fuel storage bladder (20) disposed within said chamber (16) in fluid communication with the engine through said inner housing (12), said bladder (20) including a first wall. (24) and a second wall (26) and seam means for perfecting a peripheral fuel-tight seam interconnecting said first and second walls (24, 26) said walls (24, 26) being flexible for bowing away from each other to contain fuel therebetween and lie against each other upon the application of fluid pressure by said pressurizing means (18) to empty of fuel, each of said walls (24, 26) having an inner surface (28, 30) facing the inner surface of the other of said walls, said inner surfaces (28, 30) having an equal surface area whereby said inner surfaces (28, 30) completely engage each other when said bladder (20) is emptied of fuel.

2. The engine assembly of claim 1 wherein said first wall (24) bows and said second wall (26) bows into and completely against said first wall (24) when said bladder (20) is empty, said second wall (26) bowing away from said first wall (24) when said bladder (20) is filled.

3. The engine assembly of claim 2 wherein said first wall (24) bows against said outer housing (14) and said second wall (26) being spaced from said inner housing (12) when said bladder (20) is empty of fluid, said second wall (26) bowing towards and away from said inner wall (24) as said bladder (20) is filled and emptied, respectively.

4. An engine assembly (10) comprising: an inner housing (12) containing an engine; an outer housing (14) disposed about said inner housing (12) and defining a sealed chamber (16) therebetween; pressurizing means (18) for forcing fluid pressure into said chamber (16); and a fuel storage bladder (20) disposed within said chamber (16) in fluid communication with the engine through said inner housing (12), said bladder (20) including a first wall (24) and a second wall (26) and seam means for perfecting a peripheral fuel-tight seam interconnecting said first and second walls (24, 26), said walls (24, 26) being flexible for bowing away from each other to contain fuel therebetween and lie against each other upon the application of fluid pressure by said pressurizing means (18) to empty of fuel, each of said walls (24, 26) having an inner surface (28, 30) facing the inner surface of the other of said walls, said inner surfaces (28,30) having an equal surface area whereby said inner surfaces (28,30) completely engage each other when said bladder (20) is emptied of fuel, each of said walls comprising a plurality of sheets (32,34,36,38,40,42) having edges overlapping edges of adjacent sheets, said edges including stress distributing means for relieving the stresses of bowing of the edges of adjacent sheets as said walls (24,26) bow during emptying and filling of said bladder assembly (20).

5. The engine assembly of claim 4 wherein said stress distributing means includes a plurality of recesses along the length of said edges (44, 46) extending into each of said sheets, each of said recesses being substantially U-shaped when viewed in plan view and including two diverging edge portions (48, 50) interconnected by a substantially annular edge portion (52).

6. The engine assembly of claim 5 wherein said recesses along one of said edges (44) of one of said sheets is, offset from said recesses along said edge (46) of said sheet adhered thereto.

7. The engine assembly of claim 6 wherein each of said walls (24, 26) includes a peripheral edge (55, 56) thereabout, said bladder assembly (20) including a tape (58) being substantially U-shaped when viewed in sagital cross-section and having two legs (60, 62) and an intermediate portion (14) therebetween, each of said legs (60, 62) being adhered to said inner surface of one of said walls (24, 26), said U shape of said tape (58) opening into said bladder assembly (20), said bladder assembly (20) further including an outer sealant (70) disposed about said peripheral edges, said sealant appearing U-shaped when viewed in sagital cross-section.

8. A fuel storage bladder assembly (20) of the type to be disposed within a sealed chamber (16) and collapsing under the application of pressure in the chamber (16) to force fluid out of said bladder assembly (20), said bladder assembly (20) comprising: a first wall (24); a second wall (21); and seam means for perfecting a fuel-tight seam interconnecting said first and second walls (24,26), said walls (24, 26) being flexible for bowing away from each other to contain fluid therebetween and lie against each other upon the application of fluid pressure thereagainst to empty of fuel, each of said walls (24,26) having an inner surface (28,30) facing the inner surface of the other of said walls, said inner surfaces (28,30) having an equal surface area whereby said inner surfaces (28,30) completely engage each other when said bladder assembly (20) is emptied of fuel, each of said walls (24,26) comprising a plurality of sheets (32,34,36,38,40,42) having edges overlapping edges of adjacent sheets, said edges including stress distributing means for relieving the stresses of bowing of the edges of said sheets as said walls (24,26) bow during emptying and filling of said bladder assembly (20).

9. The bladder assembly of claim 8 wherein said stress distributing means includes a plurality of recesses along the length of said edges (44, 46) extending into each of said sheets, each of said recesses being substantially U-shaped when viewed in plan view and including two diverging edge portions (48, 50) interconnected by a substantially annular edge portion (52).

10. The bladder assembly of claim 9 wherein said recesses along one of said edges (44) of one of said sheets being offset from said recesses along said edge (46) of said sheet adhered thereto.

11. The bladder assembly of claim 10 wherein each of said walls (24, 26) includes a peripheral edge (55, 56) thereabout, said bladder assembly (20) including a tape (58) being substantially U-shaped when viewed in sagital cross-section and having two legs (60, 62) and an intermediate portion (14) therebetween, each of said legs (60, 62) being adhered to said inner surface of one of said walls (24, 26), said U shape of said tape (58) opening into said bladder assembly (20), said bladder assembly (20) further including an outer sealant (70) disposed about said peripheral edges, said sealant appearing U shaped when viewed in sagital cross-section.

* * * * *